(12) United States Patent
Cotner et al.

(10) Patent No.: US 6,816,874 B1
(45) Date of Patent: Nov. 9, 2004

(54) METHOD, SYSTEM, AND PROGRAM FOR ACCESSING PERFORMANCE DATA

(75) Inventors: Curt Lee Cotner, Gilroy, CA (US); Catherine Elizabeth Drummond, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/394,292

(22) Filed: Sep. 10, 1999

(51) Int. Cl.[7] .............................................. G06F 12/00
(52) U.S. Cl. ...................... 707/204; 707/200; 707/205; 707/203; 707/101
(58) Field of Search ............................. 717/4; 709/200, 709/230, 204; 707/200, 205, 204, 203, 101

(56) References Cited

U.S. PATENT DOCUMENTS

| | | | |
|---|---|---|---|
| 5,440,692 A | | 8/1995 | Janicek |
| 5,574,900 A | | 11/1996 | Huang et al. |
| 5,644,768 A | * | 7/1997 | Periwal ........................ 707/8 |
| 5,758,144 A | | 5/1998 | Eberhard et al. |
| 5,956,509 A | * | 9/1999 | Kevner ........................ 707/10 |
| 5,970,248 A | * | 10/1999 | Meier ........................ 709/230 |
| 5,983,225 A | * | 11/1999 | Anfindsen ..................... 707/8 |
| 5,987,517 A | * | 11/1999 | Firth et al. .................. 709/230 |
| 6,006,230 A | * | 12/1999 | Ludwig et al. .............. 707/10 |
| 6,038,562 A | * | 3/2000 | Anjur et al. .................. 707/10 |
| 6,067,604 A | * | 5/2000 | Ramachandran et al. ... 711/149 |
| 6,112,024 A | * | 8/2000 | Almond et al. ............. 707/203 |
| 6,324,683 B1 | * | 11/2001 | Fuh et al. ...................... 717/4 |

OTHER PUBLICATIONS

IBM, "DB2 for OS/390 Version 5 Administration Guide", SC26–8957–02, Jun. 1997, pp. 4–24 –4–47.

* cited by examiner

*Primary Examiner*—Kim Vu
*Assistant Examiner*—Cam Y Truong
(74) *Attorney, Agent, or Firm*—David W. Victor; Konrad, Raynes & Victor LLP

(57) ABSTRACT

Disclosed is a method, system, and program for accessing performance data. A call from an application program including database program statements, such as SQL statements, executing on a thread is processed. This call is used to access performance data for at least one database program statement executing on the thread. The thread further processes the accessed performance data returned in response to the call.

36 Claims, 6 Drawing Sheets

METHOD, SYSTEM, AND PROGRAM FOR ACCESSING PERFORMANCE DATA

BACKGROUND OF THE INVENTION

1. Field of the Invention

The present invention relates to a method, system, and program for determining performance data with respect to the execution of database program statements in an application program.

2. Description of the Related Art

The Structured Query Language (SQL) command language provides commands to use to search and perform operations with respect to a relational database. The SQL language statements instruct a database manager program, which manages access to the data in the database, on what data to access. SQL statements are typically included in an application program that sequentially executes the SQL statements to perform specific database operations. In large scale databases, storing millions and perhaps billions of records, the performance of an application consisting of SQL statements can have a significant affect on overall system performance, especially if the SQL statements search on all the records in such large scale databases.

Database programs typically include a performance measurement tool to measure the performance of SQL statements and other database operations For instance, the International Business Machines Corporation (IBM) DB2 database family of products includes a performance monitor tool. Oftentimes, database users want to determine the performance of SQL operations for the purpose of fine tuning the SQL commands to optimize performance of the SQL application. Certain of the performance statistics for SQL statements that can be monitored include, the CPU consumed by each individual SQL statement or application, the time to run a statement, the number of rows read and returned, and the use of database resources, such as buffer pool, prefetcher, and SQL cache. These run-time metrics are useful in tuning queries for optimal utilization of database resources. Modifying a query or certain system parameters can result in dramatic performance improvements. Further, the impact of modifications can be measured with the database system monitor.

DB2 generates performance data referred to as instrumentation data and provides the capability to gather, analyze, and report on DB2 instrumentation data. To begin collecting performance data, a user would activate an event monitor that starts a new process or thread, which records monitor data to either memory, a named pipe or a file as events occur. The event may be monitored as soon as the database is started, so that all activity is monitored from start-up. The DB2 performance monitor further includes snapshot monitoring which provides information as of a point in time. The event monitor is activated using DB2 commands. The event monitor program would return information on all the SQL statements executing in all threads during the activation of the event monitor, and return statement start/stop time, CPU used, text of dynamic SQL, SQLCA (return code of SQL statement), and other metrics such as fetch count. In current implementations, the DB2 event monitor may return SQL performance data on all threads being executed within the database. In this way, the event monitor would trace the execution of all SQL statements and other activity ongoing in the database during the execution of the event monitor, such as detection of a deadlock, end of unit of work, end of a connection, etc. Further details of the current DB2 Performance Monitor is described in the IBM publication "IBM DB2 Universal Database: System Monitor Guide and Reference, Version 5," IBM Publication No. S10J-8164-00 (Copyright IBM Corp., 1997).

There is a need in the art for improved performance monitors that provide more fine grained control over the ability to monitor and the performance of SQL statements.

SUMMARY OF THE PREFERRED EMBODIMENTS

To provide improvements to the prior art described above, preferred embodiments disclose a method, system, and program for accessing performance data. A call from an application program including database program statements executing on a thread is processed. This call is used to access performance data for at least one database program statement executing on the thread.

The database program statements may comprise database access calls, SQL statements, and/or database commands.

In further embodiments, the performance data returned in response to the call includes performance data from when the thread began processing database program statements in the application program. Alternatively, the returned performance data includes performance data with respect to the execution of at least one database program statement within the application program.

In yet further embodiments an additional program, referred to herein as the performance monitor program and which may be implemented as a stored procedure, accesses performance data for the thread on with the application program was executing. This performance monitor program processes the performance data to determine requested performance data and returns the requested performance data to the application program.

Preferred embodiments provide calls which may be included in an application program, such as an SQL application including a series of SQL statements, to return performance data just for the thread on which the application is executing. Performance data may be provided for the entire time during which the thread was executing the application up until the time the call was made or include the performance data for one or more SQL statements within the application. The preferred calls may be placed at different locations in the application to determine performance with respect to different parts of the application program. The call is processed by a separate application program, e.g., the performance monitor program, which gathers the performance data specific to the application from which the call was made and returns the performance data to the calling application.

Preferred embodiments provide a straightforward mechanism to obtain performance data by providing calls that may be inserted at different locations within the application, e.g., SQL application, being tested. In this way software developers can determine the performance of one or more SQL statements within an application and determine whether adjustments need to be made to such SQL statements to optimize performance. Moreover, calls may be made within the adjusted and optimized application program to determine whether such adjustments did in fact improve performance.

Preferred embodiments are especially useful in a large scale database environment where the performance of an SQL application program processing millions or billions of records can have a significant impact on overall system performance.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
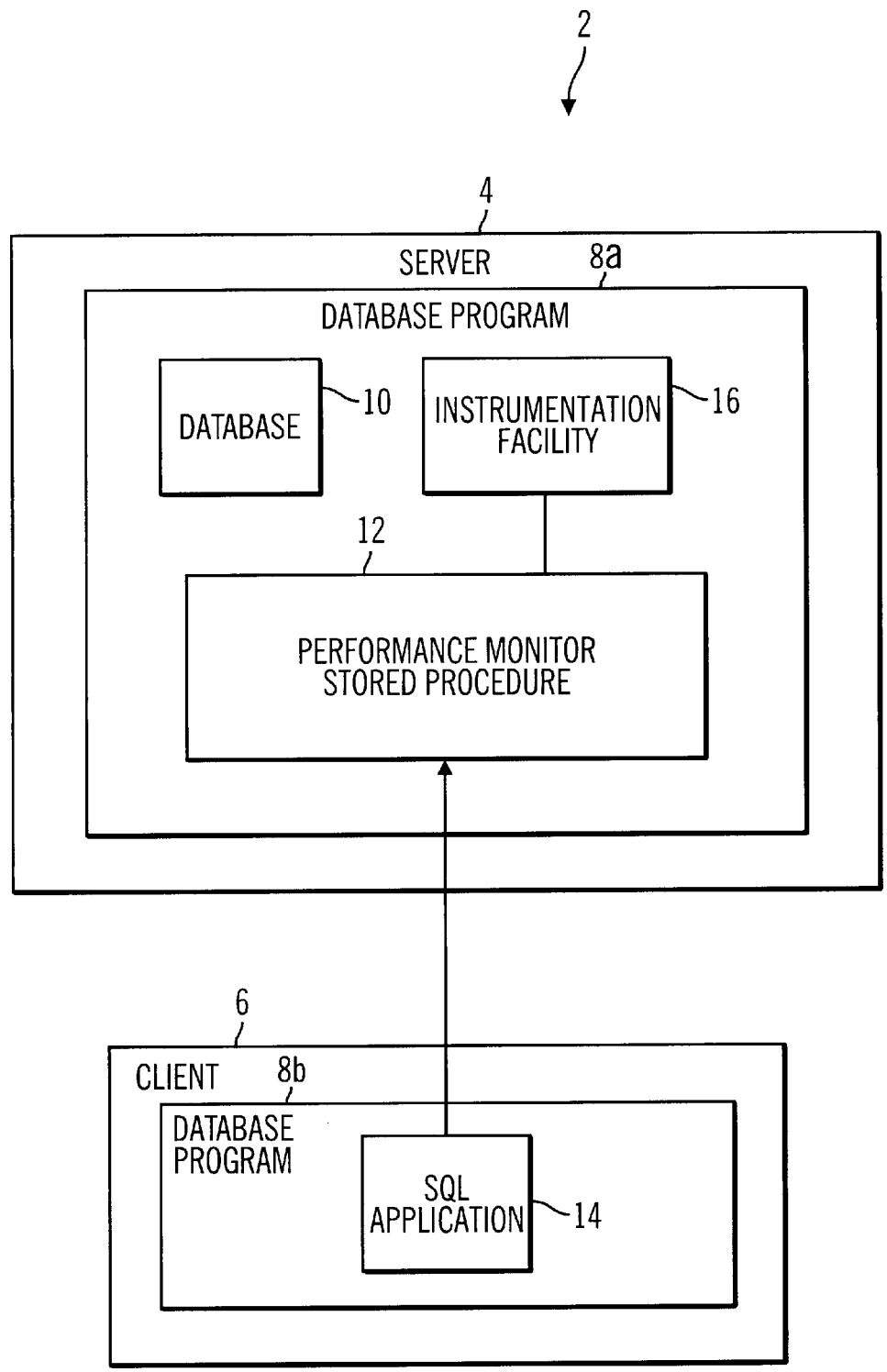
FIG. 1 illustrates a computing environment in which preferred embodiments are implemented.

FIG. 1 illustrates a computing environment 2 in which preferred embodiments are implemented. The environment 2 includes a server 4 and client 6. The server 4 and client 6 would include an operating system, such as MICROSOFT WINDOWS 98 and WINDOWS NT, AIX, OS/390, OS/2, MVS,** and may be comprised of any suitable server and client architecture known in the art. The server 4 and client 6 include a database program 8a and 8b, respectively, wherein 8a comprises the server 4 side of the database program and 8b comprises the client 6 side. In further embodiments, the functions and operations described with respect to the client 6 may be implemented within the server 4. The server 4 and client 6 may communicate via any communication means known in the art, such as a telephone line, dedicated cable or network line, etc, using any protocol known in the art including TCP/IP network (e.g., an Intranet, the Internet), LAN, Ethernet, WAN, Token Ring, etc. Alternatively, there may be separate and different networks between the server 4 and client 6.

The client/server database programs 8a, b, may be comprised of any client/server database program known in the art, such as DB2, Oracle Corporation's ORACLE 8, Microsoft SQL Server,** etc. The database programs 8a and 8b are used to access and perform operations with respect to information maintained in one or more databases 10. Further details of the architecture and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in their entirety.

**Microsoft, Windows, and Windows NT are registered trademarks and SQL Server is a trademark of Microsoft Corporation; DB2, AIX, OS/390, and OS/2 are registered trademarks of IBM, MVS is a trademark of IBM; and Oracle8 is a trademark of Oracle Corporation.

In preferred embodiments, a performance monitor stored procedure 12 (performance monitor 12) gathers performance data in response to parameters passed from an SQL application 14 executing in the client 6. In preferred embodiments, the performance monitor 12 is implemented as a stored procedure database program. A stored procedure is a block of procedural constructs and embedded SQL statements, i.e., an application program, that is stored in a database and can be called by name to execute within the database server 4. Stored procedures allow an application program to execute in two parts. One part runs on the client 6 and the other on the server 4. This allows one client call to produce several accesses of the database from the stored procedure executing on the server 4 including the database. Stored procedures are particularly useful to process a large number of database records, e.g., millions to billions of records, without having to transfer data between the server 4 and client 6. The SQL application 14 passes parameters when calling the performance monitor stored procedure 12. The performance monitor 12 is activated by calls from the SQL application 14 in the client. Further details of stored procedures are described in the publication "A Complete Guide to DB2 Universal Database," which was incorporated by reference above.

A user would include calls to the performance monitor 12 at one or more points in the SQL application 14. In response to a call to the performance monitor 12 during execution of the SQL application 14, the performance monitor 12 would execute on the thread on which the SQL application was running and process parameters passed with the call.

An instrumentation facility component (IFC) 16 traces database events and gathers performance statistics for database operations. The instrumentation facility 16 may comprise the DB2 instrumentation facility component (IFC) that provides a trace facility to record DB2 data and events in a manner known in the art. The performance data may be accessed and generated into reports. In preferred embodiments, the instrumentation facility 16 would gather the following performance data, which would include performance data related to the execution of an application program, such as the SQL application 14.

CPU time in external format: This indicates the total CPU time (in seconds and microseconds) used during the monitored event, which may be the database manager agent process, such as an SQL command. This measurement is helpful for identifying applications or queries that consume large amounts of CPU.

Latch/Lock Contention Wait Time: The time a thread or application has to wait to obtain a lock to access a file during a monitored time.

Number of getpages: indicates data copied from non-volatile storage to pages in memory, i.e., paged into memory.

Number of I/O reads: indicates the number of I/O reads during the monitored event.

Number of Write I/Os: indicates the number of write operations during the monitored event.

Time values are initially reported as store clock values. The performance monitor 12 would then convert the store clock values to a time value expressed as an integer number and/or external format. The external format provides greater detail on the time value than the integer number, which only reports out to hundredths of a second. However, the integer number is easier to manipulate in calculations than the external format number.

An SQL application 14 executes on a single thread of execution in the database programs 8a, 8b. A thread is an independent flow of control that operates within the same address space as other independent flows of controls and comprises a sequence of executed instructions. The database program 8a assigns a control element to address and identify the thread. In the current DB2 system, each thread is assigned a hexadecimal address referred to as a agent control element address (ACE). The instrumentation facility 16 maintains performance data by thread, wherein the threads are identified according to ACE address.

In preferred embodiments, a call to the performance monitor 12 is made from the SQL application 14. The SQL application 14 may include multiple calls to the performance monitor 12 at different points between the SQL statements. In response to the calls, the performance monitor 12 performs a series of operations to access performance data from the instrumentation facility 16 according to parameters included with the call. In preferred embodiments, the performance monitor 12 executes on the same thread that was previously executing the SQL application 14 from which the performance monitor 12 was called. In this way, when the call is made, the thread that was previously executing SQL statements is used to execute the performance monitor 12 program. The thread returns to processing the SQL application 14 after data is returned from the performance monitor 12. Thus, the performance monitor 12 executes on the thread on which it was called and gathers the data according to parameters passed with the call.

Preferred embodiments comprise a statement or command and parameters to include in the SQL application 14 to call the performance monitor 12 to gather performance data from the instrumentation facility 16. In preferred embodiments, the parameters included with the call to the performance monitor 12 include two parameters that function as input and output parameters and seven output parameters into which the performance monitor 12 inserts performance data to return to the SQL application 14. The input parameters are used to control the performance monitor 12.

TWACDBL1: input parameter for CPU time or special codes indicating first or second modes;

TWACDBL2: input parameter for lock/latch time;

TWACAJST: output parameter into which the performance monitor inserts the CPU time in external format;

TWACAWTL: output parameter into which the performance monitor inserts the latch/lock contention wait time in external format;

TBINAJST: output parameter into which the performance monitor inserts the CPU time as an integer in hundredths of a second;

TBINAWTL: output parameter into which the performance monitor inserts the latch lock contention wait time in integer format;

TBACGET: output parameter into which the performance monitor inserts the number of getpages, i.e., pages paged into memory, as an integer;

TBACRIO: output parameter into which the performance monitor inserts the number of read I/Os as an integer;

TRBACIMW: output parameter into which the performance monitor inserts the number of write I/Os as an integer.

There are at least two modes in which the SQL application 14 can call the performance monitor 12. In the first mode, the SQL application 14 calls the performance monitor 12 before and after executing one or more SQL statements for which the user wants to gather performance data, to obtain the beginning and ending time to execute one or more SQL statements that are the subject of the monitoring operation, i.e., between the two calls to the performance monitor 12. In the first mode, after the second command is called, the performance monitor 12 returns the performance data during the execution of the statements between the first and second calls. The returned data would include the CPU time and lock/latch wait time. The returned data may contain or be used to obtain the number of get pages, number of reads, number of writes, etc., that occurred during the execution of the SQL statements between the two calls. In the second mode, the performance monitor 12 returns performance data for all the output parameters since the activation of the thread executing the SQL application 14. The first mode is particularly useful because it can be used to gather performance data for one or more SQL statements in a single SQL application 14. This would allow an SQL designer to determine whether a particular set of commands can be optimized for improved performance. After modifying the SQL statements to improve performance, the SQL designer can then use the two calls to the performance monitor 12 to gather performance data for the modified SQL statements to determine whether the adjusted set of statements perform better than the previous statements.

Figure 2:
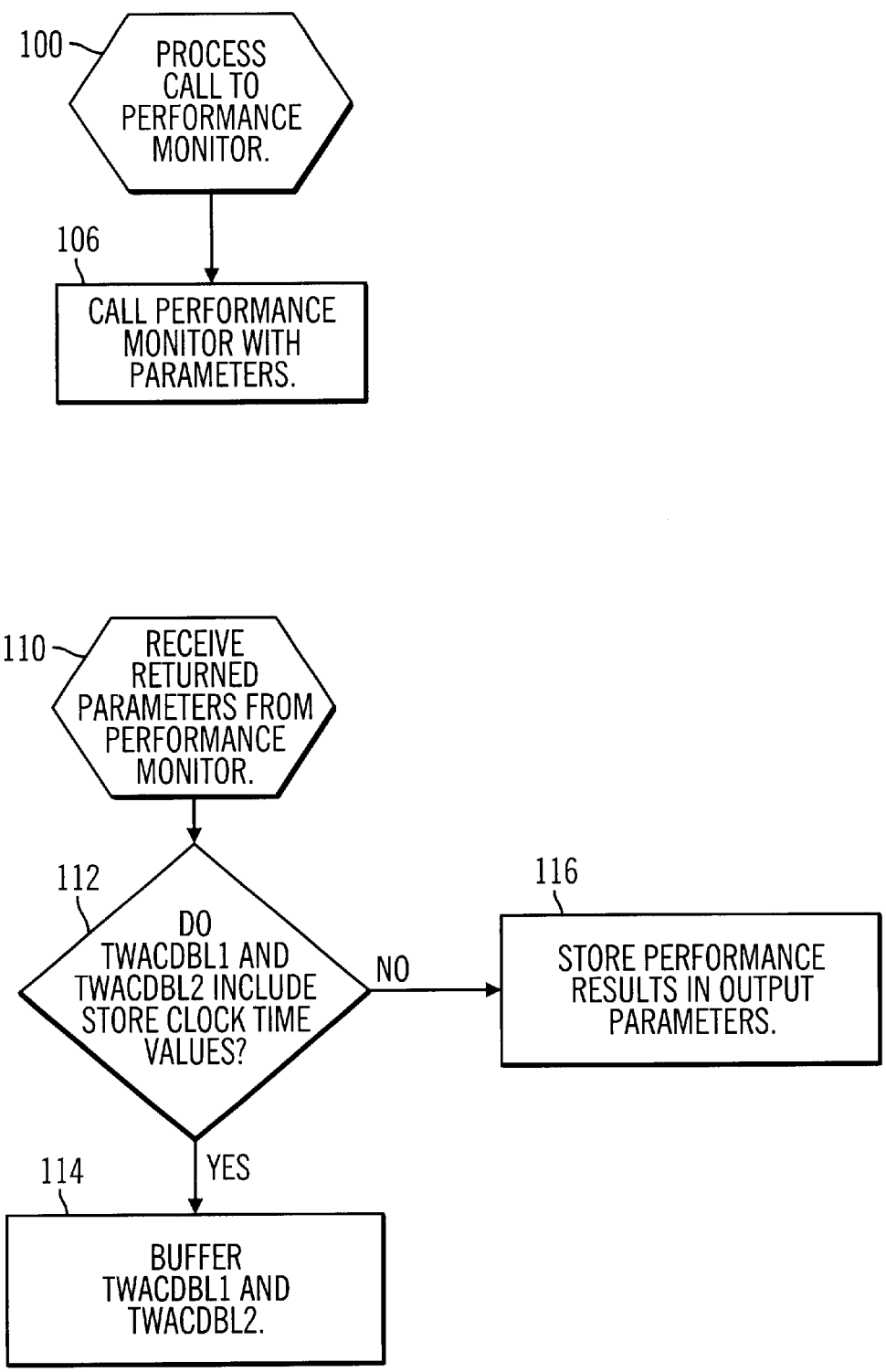
FIG. 2 illustrates logic implemented in a thread executing an application program to call a performance monitor program and process returned performance monitor data in accordance with preferred embodiments of the present invention.

FIGS. 2, 3, 4 and 5 illustrate logic implemented in the client 6 executing the SQL application 14, the performance monitor stored procedure 12, and the instrumentation facility component 16 (IFC) to implement the preferred embodiments of the present invention. FIG. 2 illustrates logic implemented within the client 6. With respect to FIG. 2, control begins at block 100 with the client 6 processing a call to the performance monitor 12 in the SQL application 14. The client 6 then transfers (at block 106) the parameters for the output parameters TWACDLB1 and TWACDLB2 to the performance monitor 12. The call to the performance monitor 12 may include the code requesting the beginning time, the code for the total time or the store clock values returned from the performance monitor 12 in response to a previous call requesting beginning times.

Upon receiving returned data from the performance monitor (at block 110), the client 6 determines (at block 112) whether the output parameters TWACDBL1 and TWACDBL2 include store clock time values for the CPU and latch/lock wait. If so, then the client 6 buffers (at block 114) the store clock time values in TWACDBL1 and TWACDBL2 to use as the input parameters in the next call to the performance monitor 12. Otherwise, the performance monitor 12 stores (at block 116) the performance results in the output parameters for later analysis of the performance of the SQL application 14. At block 116, the performance results in the output parameters could comprise the incremental performance time for one or more SQL statements between the two calls or the cumulative performance data since the activation of the thread executing the SQL application 14.

Figure 3:
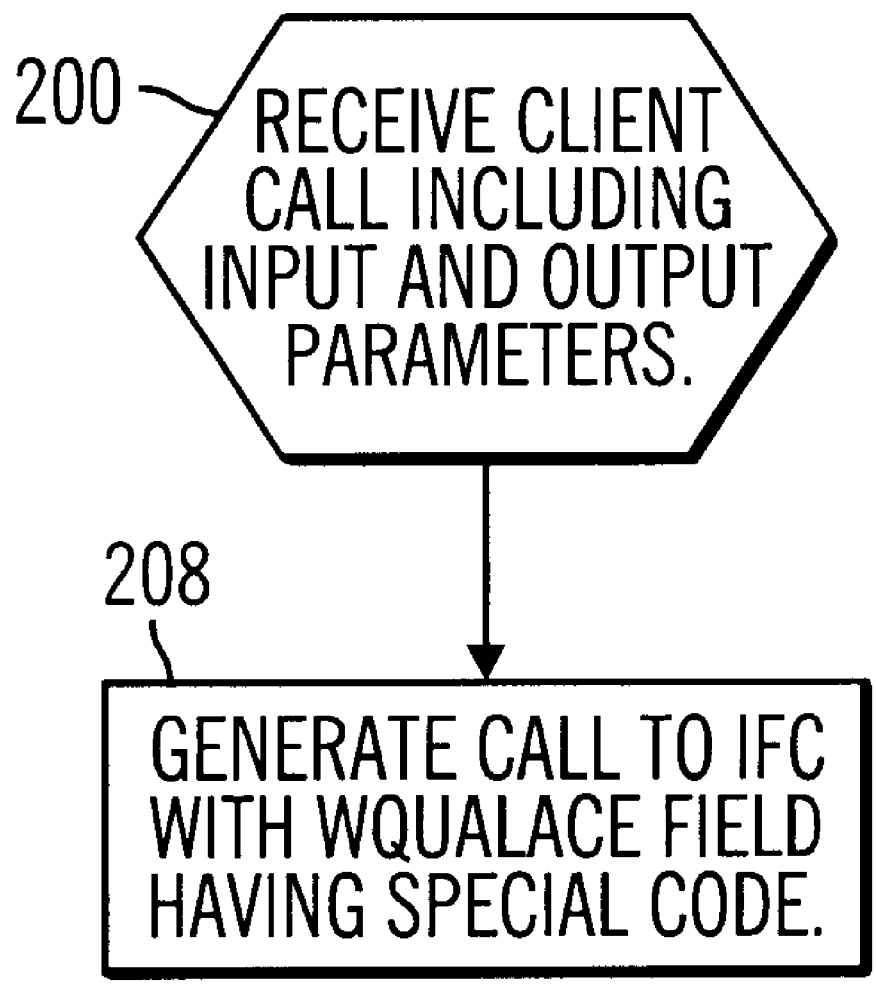
FIG. 3 illustrates logic implemented in the performance monitor program to access performance data in accordance with preferred embodiments of the present invention.

FIG. 3 illustrate logic implemented in the performance monitor 12 stored procedure executing in the server 4 to process a call to the performance monitor 12 from the client 6. With respect to FIG. 3, control begins at block 200 where the performance monitor 12 receives a call including input and output parameters. The performance monitor 12 stored procedure processes the received call and parameters on the same thread on which the call was made, i.e., the same thread previously executing the SQL application 14 from which the call was made. The performance monitor 12 then generates a call (at block 208) to the instrumentation facility component (IFC) 16 including a WQUALACE field including a special code. As discussed, this special code instructs the instrumentation facility component 16 to determine the ACE address of the calling thread and return performance data for just that thread making the call.

Figure 4:
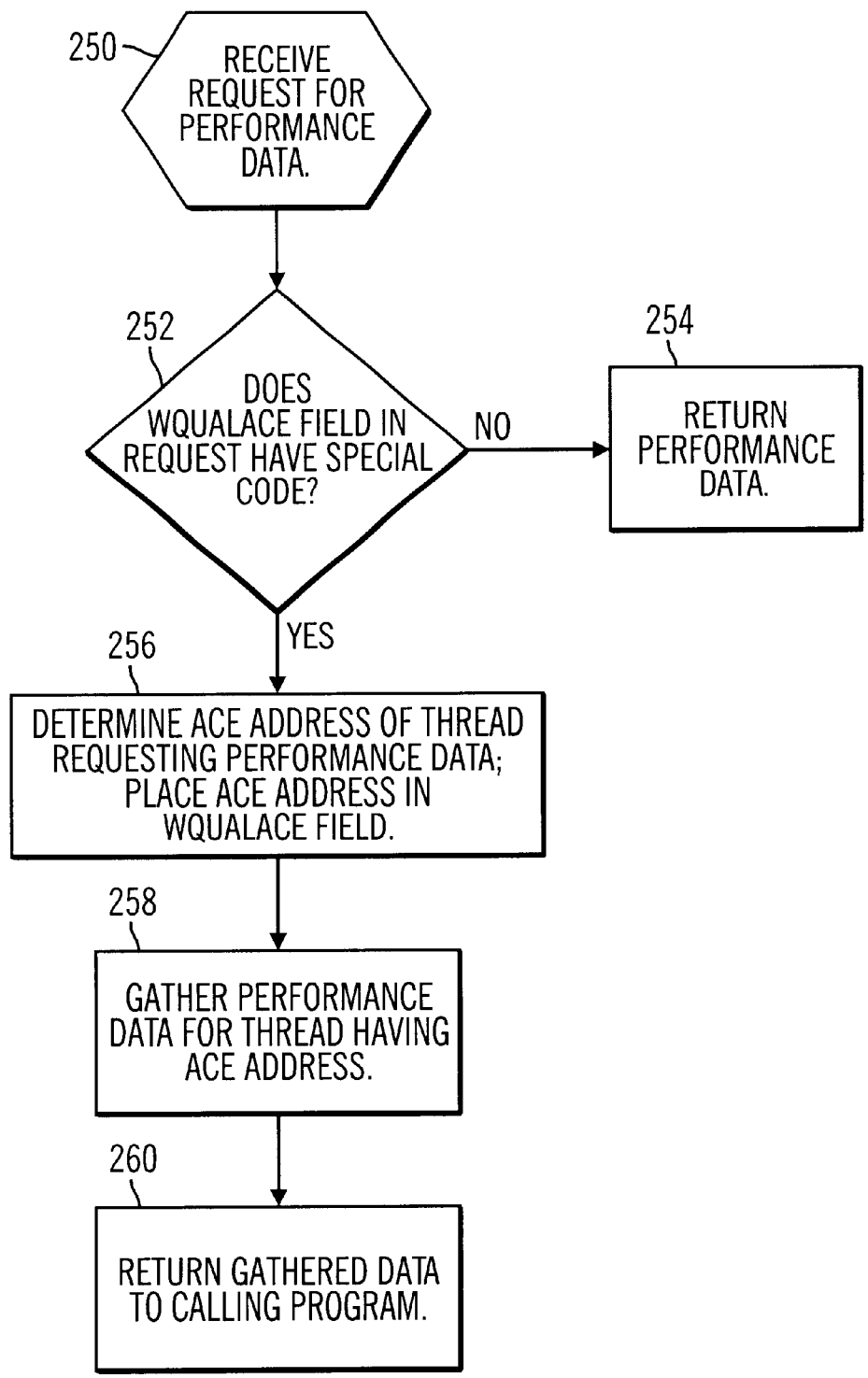
FIG. 4 illustrates logic implemented in an instrumentation facility program to access and return performance data to the performance monitor program in accordance with preferred embodiments of the present invention.

FIG. 4 illustrates logic implemented in the instrumentation facility 16 component (IFC) to process a call for performance data. The instrumentation facility 16 interfaces with the operating system, in a manner known in the art, to determine performance data across all threads executing in the database program 8a, such as the CPU time, number of pages, number of write and read I/Os, etc. At block 250, the instrumentation facility component 16 receives a request for performance data. The instrumentation facility component 16 determines (at block 252) if the special code for thread processing is included in the WQUALACE field. If not, then the instrumentation facility component 16 access (at block 254) the current state of the performance data as of the last time the instrumentation facility component 16 last queried the operating system and returns the performance data in a manner known in the art. If the special code is included in the WQUALACE field, then the instrumentation facility component 16 determines (at block 256) the ACE address of the thread requesting the performance data, in a manner known in the art, and places the ACE address in the WQUALACE field. The instrumentation facility component 16 then gathers (at block 258) the performance data for the thread having the ACE address and returns (at block 260) the gathered data to the calling program, or performance monitor 12.

Figure 5:
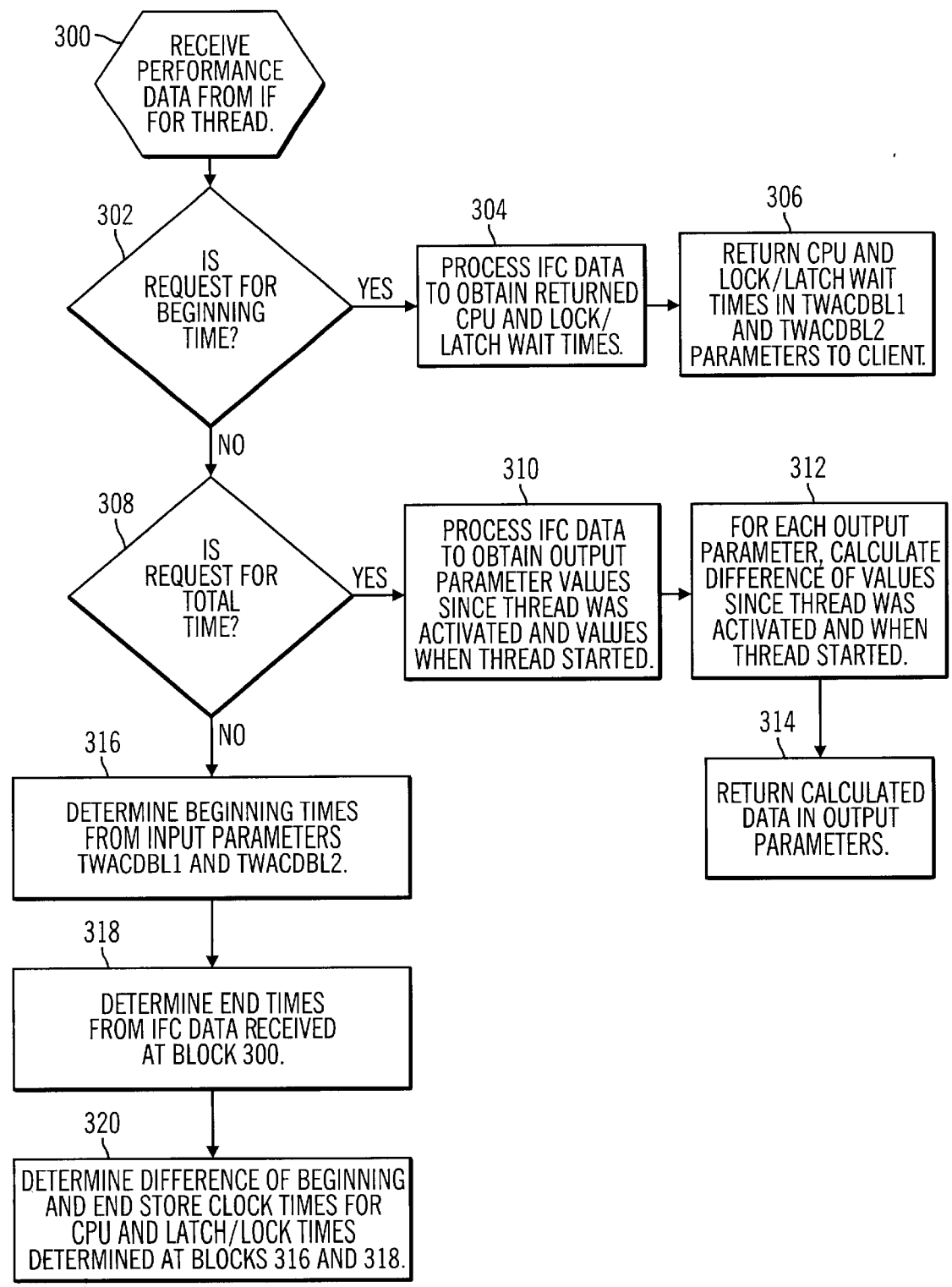
FIG. 5 illustrates logic implemented in the performance monitor program to process performance data returned from the instrumentation facility program in accordance with preferred embodiments of the present invention.

FIG. 5 illustrates logic implemented in the performance monitor 12 to process the performance data returned from the instrumentation facility 16. At block 300, the performance monitor 12 receives performance data from the instrumentation facility 16 component for the thread on which the performance monitor 12 is executing. The performance monitor 12 then determines (at block 302) whether the current call from the client 6 requested the beginning times, i.e., had the double word of hex FFs. If so, then the performance monitor 12 processes the instrumentation facility data to obtain (at block 304) the stored clock time values for the CPU and lock/latch wait times. The performance monitor 12 then places these stored clock times in the TWACDBL1 and TWACDBL2 output parameters to return to the client 6. Otherwise, if the request was not for the beginning time, then the performance monitor 12 determines whether the request was for the total time. If so, then the performance monitor 12 processes (at block 310) the instrumentation facility performance data to obtain the output parameter values at the time the thread started and the output parameter data when the instrumentation facility 16 was called, i.e., the current performance data. Then, for each time parameter, the performance monitor 12 calculates the difference of the values for the output parameters from when the thread started and the current values. The difference calculated for each output parameter is then stored in the output parameters and returned (at block 314) to the client.

If, the request was not for the beginning or total time, then the request must be for the ending time following the execution of one or more SQL statements between the calls for the beginning and end data. In such case, the performance monitor 12 determines (at block 316) the beginning times from the input parameters TWACDBL1 and TWACDBL2 for the CPU and lock/latch wait times, respectively. The performance monitor 12 also determines (at block 318) the end times for the CPU and lock/latch wait times received at block 300 and calculates (at block 320) the difference, i.e., the delta, of the beginning and end times. The performance monitor would then convert the delta of the store clock time values to integer and external format to place in the output parameters. The deltas of the beginning and end times for the other output parameters, such as getpages, I/O reads, and I/O writes, can be calculated within the client 6 or performance monitor 12. If the client 6 calculates the deltas for these output parameters, then the performance monitor 12 would return the values for these output parameters when transmitting the performance data in response to the request for the beginning time and the deltas of the CPU and lock/latch times. The client 6 would then calculate the difference of getpages, I/O reads, and I/O writes in the output parameters at the beginning and ending calls. Alternatively, the client 6 could pass the beginning values for these output parameters when requesting the ending time and have the performance monitor 12 calculate and return the deltas for these parameters when returning the difference for the CPU and latch/lock wait times.

Figure 6:
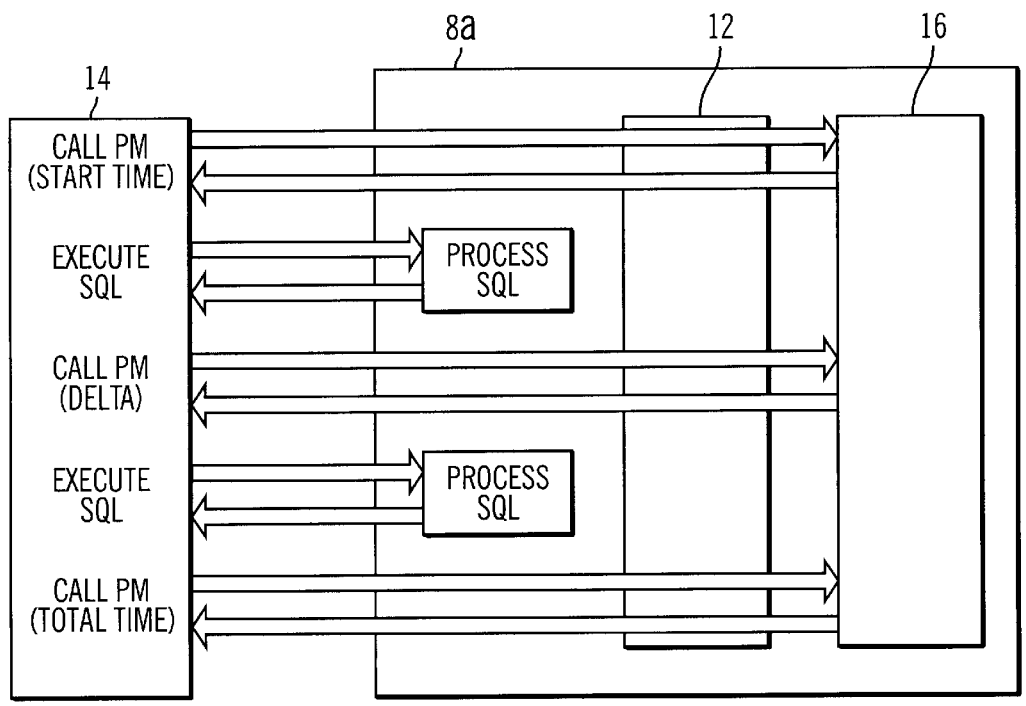
FIG. 6 illustrates a block diagram of the program flow during the execution of the preferred embodiment performance monitor calls.

FIG. 6 illustrates a block diagram showing the flow of operations between the SQL application 14, performance monitor stored procedure 12, and instrumentation facility component (IFC) 16. The SQL application 14 first calls the performance monitor 12 (PM) stored procedure requesting the start time, i.e., the beginning time. FIG. 6 illustrates how the thread processes through the performance monitor 12 and then calls the instrumentation facility component 16, where the flow of control returns the requested start time to the SQL application 14. The arrows show that the thread executes the SQL application 14, then proceeds to execute the performance monitor 12, where it makes a call to the instrumentation facility component 16. The SQL application executes SQL statements within the database 8a. The second call to the performance monitor (PM) 12 is for the deltas of the CPU and latch/lock wait times calculated using the start times returned in response to the first call. After executing additional SQL statements, the SQL application 14 calls the performance monitor 12 for the output parameter values from when the thread was activated. Those skilled in the art will appreciate that alternative program flows may be utilized in implementing the preferred embodiments in addition to the program flow illustrated in FIG. 6.

In this way, the performance data for a specific thread is returned to the client 6 when executing the SQL application 14. The returned performance data may be from the time the thread began executing (second mode) or the performance data for a set of SQL statements (first mode) between two calls to the performance monitor 12. Moreover, with current versions of the DB2 Instrumentation Facility Component (IFC), the performance data collected does not include time and resources consumed by a stored procedure. Thus, with the preferred embodiments, the performance data only includes the time to process the SQL statements and does not include the time the performance monitor stored procedure 12 spends obtaining performance data from the instrumentation facility component 16, processing the data, and extracting relevant data to return to the SQL application 14.

Preferred embodiments allow an SQL application to receive performance data for executing one or more specific SQL statements or as of the time the thread on which the SQL application is processed was activated. Preferred embodiments allow an SQL application to access performance data at different points in the SQL program processing. In return the specific performance data is returned to the SQL application 14. This avoids the need of the SQL application to interface directly with the instrumentation facility 16 and format the performance data to locate the performance data for the SQL application 14 processing.

Preferred embodiments provide straightforward SQL calls that can be used to return performance data at specific points of time in the SQL application 14. Multiple calls may be used to determine performance time for multiple groups of SQL statements in the application 14 and/or the cumulative thread processing at different points in the processing of the SQL application 14. This allows SQL application designers to optimize statements and determine the performance implications of specific SQL statements included in the application. This is especially significant when designing SQL applications for large scale database that have to perform operations with respect to millions or billions of records.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof.

The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

In preferred embodiments, the performance monitor program was executed in a stored procedure type program, such as that used in the IBM DB2 database system. However, the preferred embodiments may be implemented in database programs other than DB2, utilizing other database programs' implementation of the stored procedure concept where an application is stored and executed in the database server and the results returned to the application calling the stored procedure. Alternative embodiments may be implemented in application programs other than stored procedures.

Preferred embodiments were described with respect to DB2 conventions for managing database threads and gathering performance data. However, these functions, and others described herein, may be implemented in a different manner in alternative database systems. Thus, the preferred embodiments are not limited to the specific DB2 implementation.

The preferred logic of FIGS. 2, 3, 4, and 5 described a particular flow of operation. In further embodiments, the steps described in FIGS. 2, 3, 4, and 5 may be executed in a different order, steps may be added, steps removed, and/or steps modified.

Preferred embodiments were described with respect to a specific set of input and output parameters. However, alternative embodiments may involve the use of more, less or different parameters with the call to the performance monitor program.

In preferred embodiments, the client was described as executing on a separate machine connected to the server 4 via a network. In alternative embodiments, the operations described as performed with respect to the client may be executed on the server 4.

In further embodiments, multiple clients, executing different SQL applications, may make calls to the performance monitor to cause the execution of multiple instances of the performance monitor program to determine performance data.

Preferred embodiments were described with respect to determining the performance of an SQL application program executed in a database environment. However, the preferred embodiments may apply to determining the performance of any program statements, and is not limited to SQL program statements or database environments.

In summary, preferred embodiments disclose a method, system, and program and for accessing performance data. A call from an application program including database program statements executing on a thread is processed. This call is used to access performance data for at least one database program statement executing on the thread. The thread further processes the accessed performance data returned in response to the call.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for accessing performance data, comprising processing a call from an application program including at least one program statement executing on a thread wherein the call is used to access performance data limited to performance data concerning execution of at least one program statement executing on the thread, wherein the performance data comprises information on at least one of: (i) time to execute the at least one program statement and (ii) resources used to execute the at least one program statement, wherein the accessed performance data does not include performance data concerning execution of program statements on other concurrently executing threads, and wherein the call to access the performance data executes on the thread on which the application program executes to access the performance data.

2. The method of claim 1, wherein the program statement is a member of the set of statements consisting of database access calls, SQL statements, and database commands.

3. The method of claim 1, wherein the performance data returned in response to the call includes performance data from when the thread began processing program statements in the application program.

4. The method of claim 1, wherein the performance data returned in response to the call includes performance data with respect to the execution of at least one database program statement within the application program.

5. The method of claim 1, wherein the call is a first call and wherein the performance data returned in response to the first call is first performance data, further comprising:

processing a second call from the application program, wherein at least one program statement is between the first and second calls; and processing performance data returned in response to the second call including performance data for the execution of the at least one program statement between the first and second calls.

6. The method of claim 5, wherein the second call is made with performance data returned in response to the first call.

7. The method of claim 6, further comprising:

processing at least one parameter provided with the call that indicates a point-in-time of the processing of the thread; and determining performance data for the application program at the point-in-time, wherein determining the performance data to return further: comprises determining a difference of the determined performance data at the point-in-time and the accessed performance data, and wherein returning the performance data comprises returning the determined difference of the performance data.

8. The method of claim 1, further comprising:

accessing performance data for the thread on with the application program was executing;

processing the performance data to determine requested performance data; and returning the requested performance data to the application program.

9. The method of claim 8, wherein the steps of accessing, processing, and returning the performance data are executed on the thread on which the application program is executing.

10. The method of claim 9, wherein the application program is a client process and wherein a stored procedure program executing within a database program performs the steps of accessing, processing, and returning the performance data.

11. The method of claim 1, wherein the call is a first call and wherein the performance data returned in response to the first call is first performance data, further comprising:
processing at least one program statement after processing the first call;
processing a second call after processing the at least one program statement;
including first performance data with the second call;
executing the second call with the first performance data; and
receiving, in response to the second call, performance data with respect to the execution of the at least one program statement within the application program.

12. The method of claim 1, further comprising:
querying an operating system to determine performance data for a plurality of threads executing in the operating system;
receiving a call for system performance data;
identifying a thread on which the call for performance data was made;
processing the system performance data to access performance data for the identified thread; and
returning the accessed performance data for the identified thread.

13. A system for accessing performance data, comprising:
means for processing with a thread a call from an application program including program statements executing wherein the call is used to access performance data limited to performance data concerning execution of at least one program statement executing on the thread, wherein the performance data comprises information on at least one of: (i) time to execute the at least one program statement and (ii) resources used to execute the at least one program statement, wherein the accessed performance data does not include performance data concerning execution of program statements on other concurrently executing threads, and wherein the call to access the performance data executes on the thread on which the application program executes to access the performance data; and
means for processing with the thread performance data that is returned in response to the call.

14. The system of claim 13, wherein the program statement is a member of the set of statements consisting of database access calls, SQL statements, and database commands.

15. The system of claim 13, wherein the performance data returned in response to the call includes performance data from when the thread began processing program statements in the application program.

16. The system of claim 13, wherein the performance data returned in response to the call includes performance data with respect to the execution of at least one database program statement within the application program.

17. The system of claim 13, wherein the call is a first call and wherein the performance data returned in response to the first call is first performance data, further comprising:
means for processing with the thread a second call from the application program, wherein at least one program statement is between the first and second calls; and
means for processing performance data returned in response to the second call including performance data for the execution of the at least one database program statement between the first and second calls.

18. The system of claim 17, wherein the second call is made with performance data returned in response to the first call.

19. The system of claim 18, further comprising:
means for processing at least one parameter provided with the call that indicates a point-in-time of the processing of the thread; and
means for determining performance data for the application program at the point-in-time, wherein determining the performance data to return further comprises determining a difference of the determined performance data at the point-in-time and the accessed performance data, and wherein returning the performance data comprises returning the determined difference of the performance data.

20. The system of claim 13, further comprising:
means for accessing performance data for the thread on with the application program was executing;
means for processing the performance data to determine requested performance data; and
means for returning the requested performance data to the application program.

21. The system of claim 20, wherein the means for accessing, processing, and returning the performance data are executed on the thread on which the application program is executing.

22. The system of claim 21, further comprising:
a client process executing the application program;
a database program; and
a stored procedure program executing within the database program, wherein the stored procedure includes the means for accessing, processing, and returning the performance data.

23. The system of claim 13, wherein the call is a first call and wherein the performance data returned in response to the first call is first performance data, further comprising:
means for processing at least one program statement after processing the first call;
means for processing a second call after processing the at least one database program statement;
means for including first performance data with the second call;
means for executing the second call with the first performance data; and
means for receiving, in response to the second call, performance data with respect to the execution of the at least one database program statement within the application program.

24. The system of claim 13, further comprising:
means for querying an operating system to determine performance data for a plurality of threads executing in the operating system;
means for receiving a call for system performance data;
means for identifying a thread on which the call for performance data was made;
means for processing the system performance data to access performance data for the identified thread; and
means for returning the accessed performance data for the identified thread.

25. An article of manufacture for accessing performance data, the article of manufacture comprising computer usable media including at least one computer program embedded therein that causes at least one computer to perform:

processing a call from an application program including database program statements executing on a thread wherein the call is used to access performance data limited to performance data concerning execution of at least one database program statement executing on the thread, wherein the Performance data comprises information on at least one of: (i) time to execute the at least one program statement and (ii) resources used to execute the at least one program statement, wherein the accessed performance data does not include performance data concerning execution of program statements on other concurrently executing threads, and wherein the call to access the performance data executes on the thread on which the application program executes to access the performance data; and processing, on the thread, performance data that is returned in response to the call.

26. The article of manufacture of claim 25, wherein the program statement is a member of the set of statements consisting of database access calls, SQL statements, and database commands.

27. The article of manufacture of claim 25, wherein the performance data returned in response to the call includes performance data from when the thread began processing program statements in the application program.

28. The article of manufacture of claim 25, wherein the performance data returned in response to the call includes performance data with respect to the execution of at least one database program statement within the application program.

29. The article of manufacture of claim 25, wherein the call is a first call and wherein the performance data returned in response to the first call is first performance data, further comprising:

processing a second call from the application program, wherein at least one program statement is between the first and second calls; and processing performance data returned in response to the second call including performance data for the execution of the at least one database program statement between the first and second calls.

30. The article of manufacture of claim 29, wherein the second call is made with performance data returned in response to the first call.

31. The article of manufacture of claim 30, further comprising:

processing at least one parameter provided with the call that indicates a point-in-time of the processing of the thread; and determining performance data for the application program at the point-in-time, wherein determining the performance data to return further comprises determining a difference of the determined performance data at the point-in-time and the accessed performance data, and wherein returning the performance data comprises returning the determined difference of the performance data.

32. The article of manufacture of claim 25, further comprising:

accessing performance data for the thread on with the application program was executing;

processing the performance data to determine requested performance data; and returning the requested performance data to the application program.

33. The article of manufacture of claim 32, wherein the steps of accessing, processing, and returning the performance data are executed on the thread on which the application program is executing.

34. The article of manufacture of claim 33, wherein the application program is a client process and wherein a stored procedure program executing within a database program performs the steps of accessing, processing, and returning the performance data.

35. The article of manufacture of claim 25, wherein the call is a first call and wherein the performance data returned in response to the first call is first performance data, further comprising:

processing at least one program statement after processing the first call;

processing a second call after processing the at least one program statement;

including first performance data with the second call;

executing the second call with the first performance data; and receiving, in response to the second call, performance data with respect to the execution of the at least one program statement within the application program.

36. The article of manufacture of claim 25, further comprising:

querying an operating system to determine performance data for a plurality of threads executing in the operating system;

receiving a call for system performance data;

identifying a thread on which the call for performance data was made;

processing the system performance data to access performance data for the identified thread; and returning the accessed performance data for the identified thread.

* * * * *

UNITED STATES PATENT AND TRADEMARK OFFICE
CERTIFICATE OF CORRECTION

PATENT NO. : 6,816,874 B1
APPLICATION NO. : 09/394292
DATED : November 9, 2004
INVENTOR(S) : Curt Lee Cotner and Catherine Elizabeth Drummond It is certified that error appears in the above-identified patent and that said Letters Patent is hereby corrected as shown below:

Column 10, line 52, delete "further:" and insert -- further --.

Column 12, line 1, delete "database".

Column 13, line 6, delete "Performance" and insert -- performance --.

Column 13, lines 2, 5, and 40, delete "database".

Signed and Sealed this

Thirty-first Day of July, 2007

JON W. DUDAS
*Director of the United States Patent and Trademark Office*